United States Patent [19]
Hickman et al.

[11] Patent Number: 5,635,940
[45] Date of Patent: Jun. 3, 1997

[54] COMMUNICATION CONFIGURATOR AND METHOD FOR IMPLEMENTING SAME

[76] Inventors: Paul L. Hickman, 27140 Moody Rd., Los Altos Hills, Calif. 94022; Lawrence K. Stephens, 1250 Mildred Ave., San Jose, Calif. 95125

[21] Appl. No.: 191,260

[22] Filed: Feb. 2, 1994

[51] Int. Cl.⁶ .................................................. G01S 1/24
[52] U.S. Cl. ........................ 342/389; 342/357; 379/441; 379/93
[58] Field of Search ............................. 342/389, 357; 455/33.1; 379/89, 441, 268, 97, 98, 99, 442, 59

[56] References Cited

U.S. PATENT DOCUMENTS

| | | | |
|---|---|---|---|
| Re. 31,254 | 5/1983 | Brodeur | 343/103 |
| 4,841,561 | 6/1989 | Hill | 379/97 |
| 4,868,863 | 9/1989 | Hartley et al. | 379/98 |
| 5,134,648 | 7/1992 | Hochfield et al. | 379/98 |
| 5,239,670 | 8/1993 | Schwendeman et al. | 455/13.1 |
| 5,263,177 | 11/1993 | Schieve et al. | 455/51.2 |
| 5,307,465 | 4/1994 | Iki | 395/325 |
| 5,377,261 | 12/1994 | Baals et al. | 379/201 |

Primary Examiner—Thomas H. Tarcza
Assistant Examiner—Dao L. Phan
Attorney, Agent, or Firm—Hickman Beyer & Weaver

[57] ABSTRACT

A method and apparatus for communication configuring in digital equipment based on the location of the equipment includes a mechanism determining the location of the digital equipment and a mechanism configuring a communication channel of the equipment based on the location. The location may be determined using a Global Positioning System, Global Paging System, or similar wireless communication system, or by connection to a wired network. User input may also be used in determining, in part or in whole, the location of the digital equipment. Once the location of the digital equipment has been determined, the communication channel for the digital equipment is configured based upon the location using configuration data stored with the digital equipment.

37 Claims, 10 Drawing Sheets

LOCATION DATABASE (7)

| Latitude | Longitude | City | State | Country | Zip | Area Code | Location |
|---|---|---|---|---|---|---|---|
| 37 | 122 | San Fran. | CA | USA | 94401 | 415 | 1 |
| | | | | o | | | |
| | | | | o | | | |
| | | | | o | | | |
| 36.5 | 123 | Palo Alto | CA | USA | 94022 | 415 | 19 |
| | | | | o | | | |
| | | | | o | | | |
| | | | | o | | | |
| 36 | 121 | San Jose | CA | USA | 94123 | 408 | 77 |
| | | | | o | | | |
| | | | | o | | | |
| | | | | o | | | |

CONFIGURATION DATABASE (9)

| Location | Area Code | Long Dist. Prefix | Baud Rate |
|---|---|---|---|
| 1 | 415 | 1- | 9600 |
| | | o | |
| | | o | |
| | | o | |
| 19 | 415 | 1- | 19,200 |
| | | o | |
| | | o | |
| | | o | |
| 77,99 | 408 | NULL | 2400 |
| | | o | |
| | | o | |
| | | o | |

COMMUNICATION CONFIGURATOR AND METHOD FOR IMPLEMENTING SAME

BACKGROUND OF THE INVENTION

This invention relates to digital equipment, and more particularly to the reconfiguration of communication protocols and commands of portable digital equipment to reflect local conditions.

Digital equipment such as computers, personal digital assistants (PDA's), digital personal organizers, etc. are in widespread use around the world. When digital equipment is moved to a new location, it may be necessary to reconfigure the equipment so that it may properly communicate with, for example, a local telephone system or local area network. For instance, it may be necessary to reconfigure the communication commands, processes and/or protocols of a portable computer based on the physical location of the device.

Reconfiguring the communication process may be necessary to facilitate the communication standards used in a particular country, or to acquire a particular dialing sequence and protocol for connecting to an information service, or other configuration parameters necessary to facilitate communications in a particular location. For example, it may be necessary to reconfigure communication protocols of a computer system as the computer system is moved from one area code to another, or is moved between nodes of a local area network.

The need to reconfigure a digital equipment based on its location is long-felt in the industry, although solutions to the need has only been partially been addressed in the prior art. For example, in U.S. Pat. No. 5,134,648 a reconfigurable modem suitable for connecting data processing equipment to a plurality of different communication networks is disclosed. The modem's hardware is configured to facilitate the network standard of the particular country where the modem is located. An external coupling device is used for input the location of the modem, where the coupling device contains an identifier which corresponds to the network standard of a particular country. The modem reads the identifier from the coupling device and then reconfigures itself with the corresponding configuration data to facilitate the particular country's network.

A practical problem associated with this method of determining the modem's location is that the user must carry and connect the coupling devices which correspond to each country. Besides the inconvenience of having to carry and connect an extra device, the user must know which device is appropriate for any given location. If the user does not have the correct coupling device for a given location, the modem cannot be used. If the wrong coupling device is inserted, the system will, in all likelihood, not work. Also, there is some expense involved, since a separate coupling device must be purchased for each location in which the modem is to be used.

Another problem with this method is that while it reconfigures the modem so that it can be coupled to different communications networks, it does not reconfigure location-dependent data and commands stored within the digital equipment that is to be transmitted over the modem in order to form a communications link. For example, if a user desires to dial into one or more databases or networks in a home location, the method of the prior art does not automatically modify the telephone number to reflect the fact that the user is in a different location, e.g. a different country or area code. The user, therefore, still has to modify telephone dialing data associated with one or more communication programs so that the modem can correctly dial into the desired database or network.

A method currently used for configuring a communication process for accessing an information service is to have the user enter primary and secondary local access phone numbers as well as configure the modem for the appropriate protocol. The problem with this method is that the user must know the current location, the access phone numbers available for the location, and the communication protocol for each access number. Besides having to acquire the access numbers and communication protocol, the user must configure the communication process manually. It would be desirable to overcome this limitation of the prior art by having the computer system automatically dial into a proper node of the information service without requiring the manual reconfiguration of the computer system.

The aforementioned problems are compounded by the number of networks and databases a modern digital equipment may have access to. It is not at all unusual for a portable computer, for example, to be provided with a half dozen or so software programs that allow the computer to dial into a like number of different databases or networks. If the portable computer is moved frequently between geographic locations where, for example, the area code or the need for the long distance prefix "1" varies, a user must modify the dial-in number for each of those programs each time the personal computer is moved between area codes. This, obviously, is a wasteful and time-consuming process that would be desirable to avoid.

SUMMARY OF THE INVENTION

The present invention overcomes the limitations of the prior art by providing an improved method and apparatus for reconfiguring digital equipment. Rather than merely reconfiguring a communications channel (such as a modem) for local conditions, the process and apparatus of the present invention also modifies communication data and commands (e.g. telephone numbers or network node ID numbers) to reflect local conditions.

The present invention preferably includes a microprocessor running a computer-implemented configuration process for configuring a digital equipment's communication processes based upon the equipment's current location. The current location is determined by the configuration process using location information communicated to the digital equipment from a "position" input. Determining the current location may be wholly automated, or aided by user input.

In a preferred embodiment, the current location of a piece of digital equipment may be determined using a Global Positioning System (GPS) such as NAVSTAR. A Global Positioning System uses orbiting satellites to transmit positioning information to a GPS receiver coupled to or forming part of the digital equipment, enabling the equipment to determine its precise geographic location. Receivers for GPS systems are as small as hand held calculators, and being so, are well suited for the present invention.

Another preferred embodiment uses a LORAN positioning system for determining the device's geographic location a few hundred feet. The LORAN system uses ground stations for transmitting positioning information to a receiver included with the digital equipment.

In yet another preferred embodiment, a position input is received from Global Paging System or simulcast communication systems. A receiver is included with the digital equipment for receiving the identifier codes, enabling the device to determine its current location.

User input may also be used in determining the equipment's current location either to aid the automated systems, or as the position input itself. The configuration process may solicit location identifiers from the user such as a city name, area code, and/or zip code. The user input means includes, but is not limited to, keyboard, mouse, voice, or pen input. The configuration process uses the entered location identifiers to verify, override, or enhance the automated locating systems. For digital equipment with graphical user interfaces, maps such as world, countries, states, and cities may be displayed for the user to select the geographic location with a pointer device such as a mouse or pen.

The information for configuring the digital equipment is preferably stored with the digital equipment in a non-volatile storage medium such as a hard drive, ROM, a flash card (e.g. a PCMCIA card), etc. After the geographic location is determined, the configuration process uses the determined location to retrieve the corresponding configuration information. The configuration information is used to configure the digital equipment by either incorporating the configuration process into the communications application, or by intercepting the communication information and/or commands as it is being sent by the application to the communication channel and replacing it with the configuration information for the new geographic location. Therefore, the process of a preferred embodiment is advantageous in that it can work with existing software, such as communications software, without requiring any modifications or updates to the communications software.

One application of the invention is to aid is the reconfiguration of digital equipment as it is moved from one location to another. For example, if a portable computer is moved between the office and home, it would be desirable to reconfigure a number of communication programs and protocols to reflect the location in which it is being used. Prefixes of telephone numbers might be changed, as well as the requirement to dial a "9" for an outside line. If a NetModem was used at the office, and an internal modem was used at home, the data provided by the modem software within the digital equipment (e.g. desired ports of communication and drivers used) should also be altered. Furthermore, other parameters such as communication speeds can be adjusted.

Another related application of the invention is the automatic reconfiguration of a digital apparatus' communication process based on its location in order to connect to connect to the closest node of a particular electronic information service. Most electronic information services can be accessed from many places within a country, and some from around the world. To avoid long distance charges, these services provide local access phone numbers for connecting to the network. Also, the communication parameters such as baud rate, parity, data bits, and stop bits, may vary between the different local access numbers. It is necessary to reconfigure a portable computer's communication process to facilitate connecting to an information service based on the geographic location of the computer.

Further features and advantages of the present invention, as well as the structure and operation of various embodiments, are described in detail below with reference to the accompanying figures.

DETAILED DESCRIPTION OF THE PREFERRED EMBODIMENTS

Figure 1:
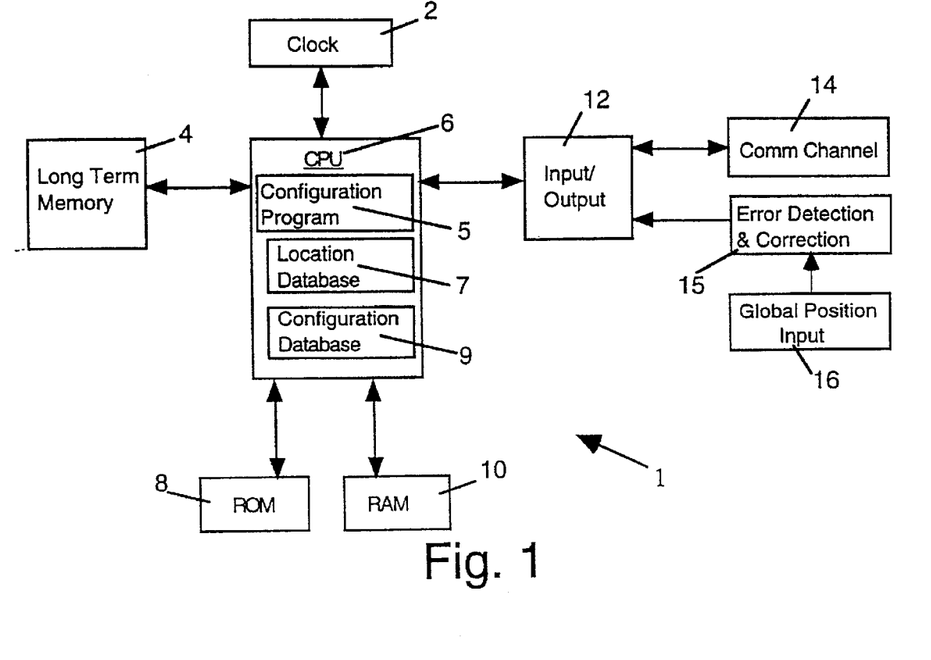
FIG. 1 is block diagram of digital equipment in accordance with a preferred embodiment.

Referring now in detail to the drawings wherein like characters refer to like elements throughout the various figures, FIG. 1 illustrates a preferred embodiment of a piece of digital equipment 1 including a clock 2, long term memory 4, microprocessor (known also as central processing unit or "CPU") 6, configuration process 5, location database 7, configuration database 9, ROM memory 8, RAM memory 10, input/output circuit 12, communication channel 14, error detection and correction circuit 15, and position input 16.

The clock 2 provides a series of clock pulses which drive the operation of the CPU 6. Typical clock rates are currently 20–50 MHz, but CPU clock rates are constantly increasing as CPU technology progresses. The long term memory 4 can be any form of non-volatile memory, i.e. any memory that does not lose its contents when electrical power to the memory is removed. Examples of non-volatile memory include hard disks, bubble memory, flash memory (such as PCMCIA cards), EEPROMS, EPROMS, ROMS, etc. The CPU 6 can be any one of a variety of CPU types in current usage, such as a CISC or a RISC CPU. Currently, CPU 6 is most commonly a member of the INTEL X86 line of microprocessors, such as an 80386, 80486, or PENTIUM microprocessor available from Intel Corporation of Santa Clara, Calif. ROM memory 8, RAM memory 10, input/output circuit 12, and communications channel 14 are all conventional components coupled to the CPU 6 by methods well known to those skilled in the art.

While the digital equipment 1 has components (such as the microprocessor 6, ROM 8, and RAM 10) that are included in many types of digital equipment, such as portable computers, personal digital assistants (PDA's), etc., other components such as the position input 16, process 5, and databases 7 and 9 are not standard either singly or in combination with other components of the equipment 1. The location database 7 stores information for determining location and resolving format and ambiguity errors from the location input, and the configuration database 9 stores configuration information corresponding to a plurality of locations. Databases 7 and 9 can stored in a variety of formats, as will be appreciated by those skilled in the art. The microprocessor 6 executes the configuration process 5 to accomplish the computer implemented process of a preferred embodiment.

Figure 2:
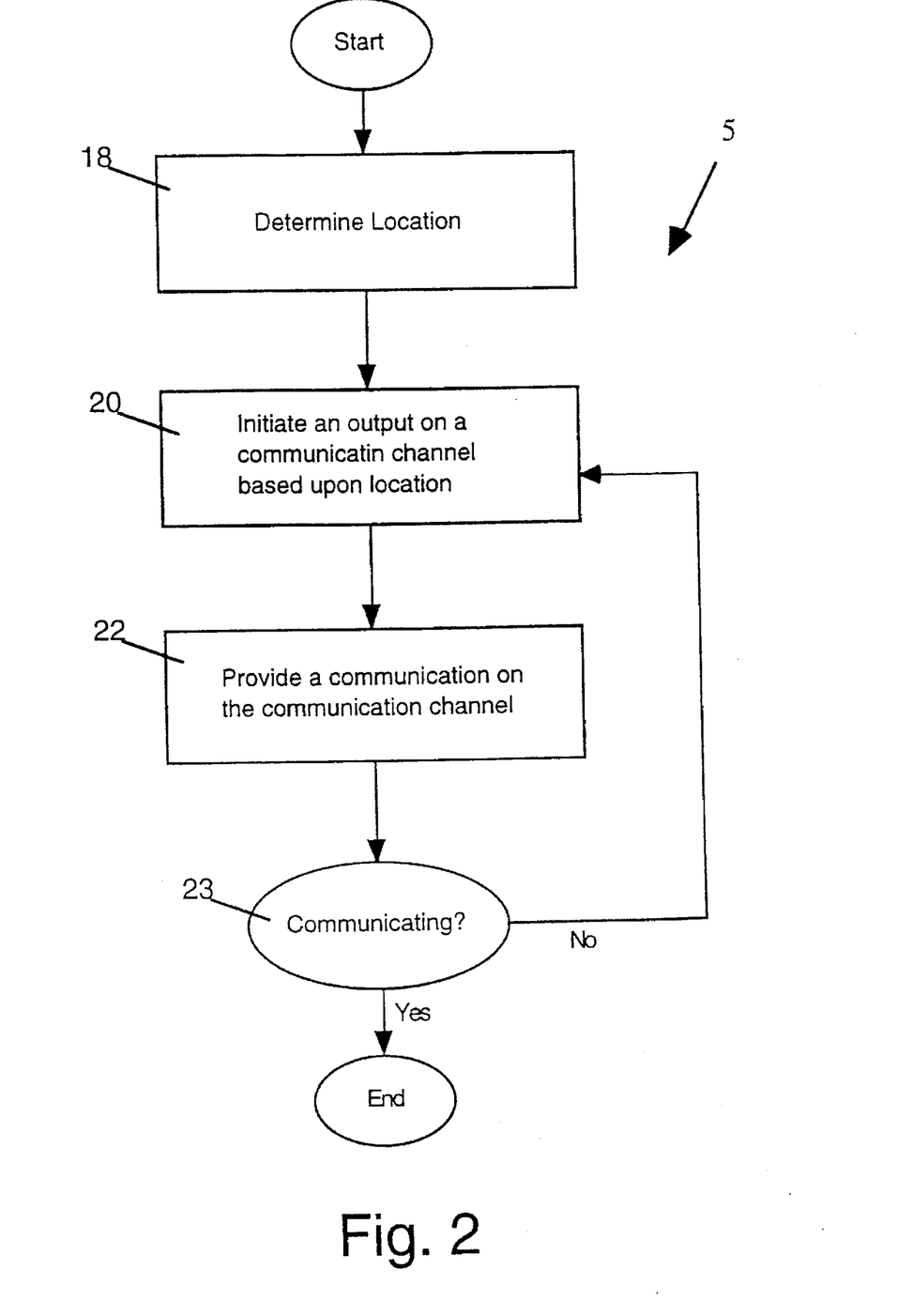
FIG. 2 is a flow chart of the steps of the configuration process in accordance with a preferred embodiment.

An overview of the configuration process 5 is illustrated in FIG. 2 and includes a step 18 of determining the digital equipment's location, a step 20 of configuring the digital equipment's communication process based on the location, a step 22 of providing a communication on a communication channel, and a step 23 of verifying that the digital equipment is communicating.

As used herein "geographic location", "current location", "location", "position" and the like will refer to any location in three dimensional space which could result in the need to reconfigure the communication capabilities of a digital system. A clear example of geographic location is encountered when a digital communications system is moved from one telephone area code to another. However, even a relatively small change in location, such as from one floor to another in a building, can result in the need to change certain communication protocols and/or commands, such as network ID numbers, router names, etc.

Figure 3:
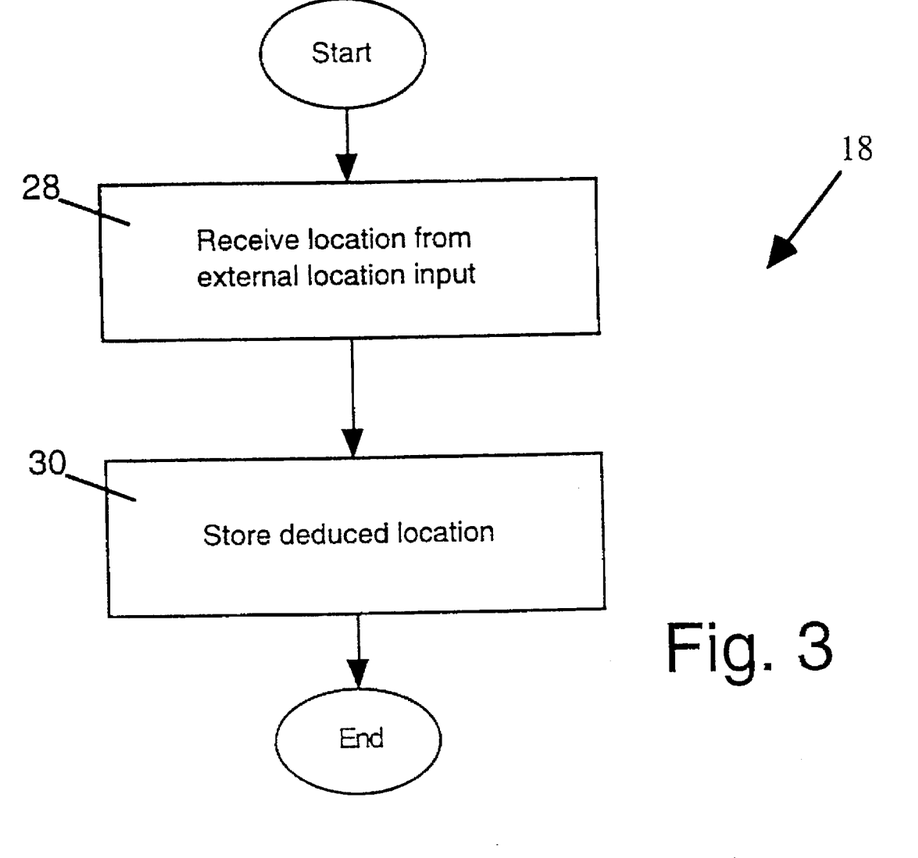
FIG. 3 is a flow chart of the steps for determining the digital equipment's location using an external input in accordance with a preferred embodiment.

In FIG. 3, the process 18 of FIG. 2 includes the steps of receiving a location input 28, and storing the deduced location 30. In a first preferred embodiment, the process of receiving a location input 28 uses a Global Positioning System (GPS) such as NAVSTAR. A Global Positioning System transmits signals to a GPS receiver as position input 16 connected to or forming a part of the digital equipment, enabling the digital equipment to determine its precise geographic location. There are GPS receivers that are the size of a small calculator, so they are well suited for portable applications. Typically, a GPS receiver can determine its absolute location coordinates to within an accuracy of several meters and can continuously update its position as it is moved. In this way, digital equipment 1 may be continuously and automatically updated on its current location, thereby allowing the automatic reconfiguration of communication protocols and data.

As mentioned above, the GPS receiver 16 can be stored within the digital equipment, or connected externally to the digital equipment 1. Reception and location computation may be completely automated and thus, preferably requires no interaction with the user (other than connecting the receiver to the digital equipment if it is an external peripheral and is not already so connected).

GPS receivers are well known in the art and discussed in "NAVSTAR Global Positioning System", edited by Tom Logsdon and published by Van Norstrand, the disclosure of which is incorporated herein by reference. Briefly, several global satellites in geostationary orbit communicate with the ground based receivers (such as GPS receiver as position input 16) allowing the receiver to determine its longitude and latitude coordinates with an extremely high degree of accuracy. The configuration process running in the CPU 6 correlates the longitude and latitude information from the GPS receiver with the information in the location database 7.

Similar to a Global Positioning System, a LORAN positioning system and receiver can be used as the position input 16. A LORAN receiver is useful for determining a digital equipment's geographic location within a few hundred (e.g. two hundred) feet, an accuracy which is often more than sufficient for a preferred embodiment. LORAN systems use land-based transmitters for transmitting analog signals to LORAN receivers. As with GPS receivers, reception and location computation is preferably automated and requires little or no user interaction.

The LORAN receiver measures the phase difference between the signals to determine its geographic location. Normally, the receiver must be able to receive the signals from at least three different transmitters to calculate the longitude and latitude coordinates. If less than three transmissions are received, the position input 16 becomes ambiguous and additional information is likely necessary to resolve the ambiguity. The configuration process correlates the longitude and latitude information from the LORAN receiver with the information in the location database 7. LORAN systems are well known in the art and a full discussion is provided in U.S. Pat. No. Re. 31,254, the disclosure of which is incorporated herein by reference.

Figure 4:
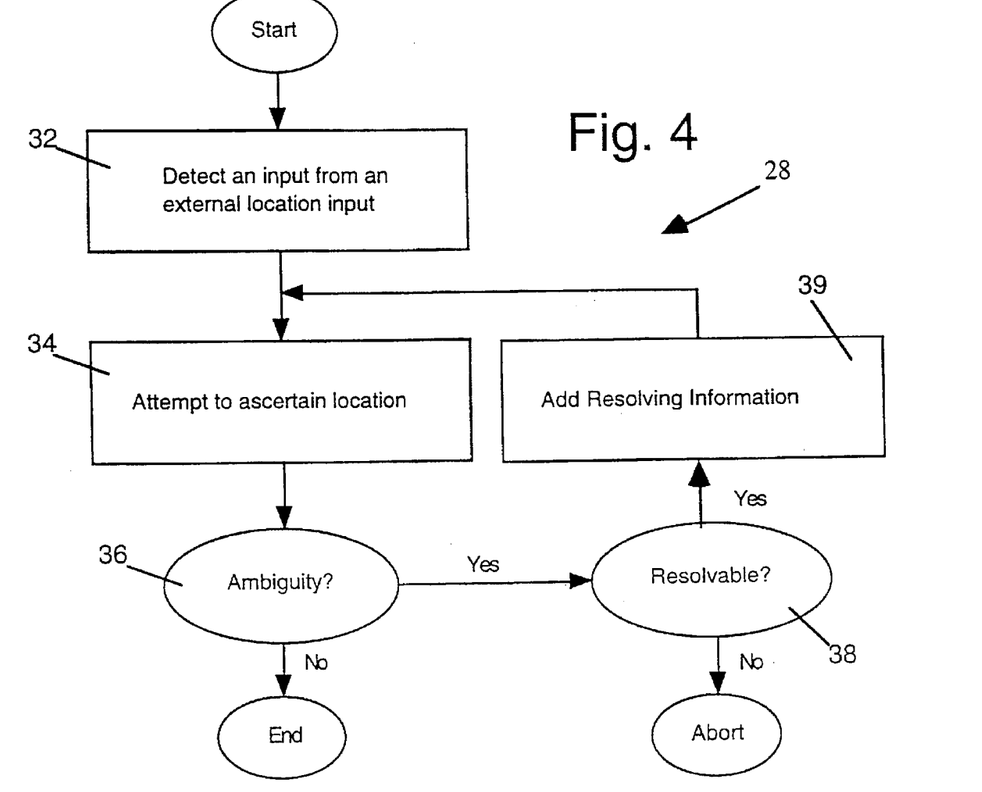
FIG. 4 is a flow chart of the steps for ascertaining the location based on the external input in accordance with a preferred embodiment.

In FIG. 4, another embodiment for the process of receiving a location input 28 uses a Global Paging System like that described in U.S. Pat. No. 5,239,670, or simulcast communication system like that described in U.S. Pat. No. 5,263,177, the disclosures of which are incorporated herein by reference. More particularly, the process 28 includes the steps of detecting the external location input in a step 32, attempting to ascertaining the actual location in a step 34, determining if there is a location ambiguity in a step 36, and determining whether any location ambiguity is resolvable in a step 38. If there is an ambiguity, and if it is resolvable, a step 39 adds resolving information and step 34 again attempts to ascertain the location until the ambiguity is either resolved or is determined to be unresolvable by step 38.

In a paging or simulcast system, a plurality of remote transmitters transmit identifier codes to corresponding geographic locations. The identifier codes are typically transmitted and received as a binary number in an analog format. Additional bits may also be transferred to implement error detection and correction (EDAC). There are application specific integrated circuits 15 for EDAC well known to those skilled in the art may be disposed between the input/output circuit 12 and the receiver 16 of FIG. 1 for receiving the identifiers. Alternatively, error detection & correction circuit 15 can be eliminated in some circumstances when the position input 16 is sufficiently error-free.

In typical applications for transmitting digital data, the number of additional bits for EDAC is limited by the transmission rate (bandwidth). Using more bits for EDAC is desirable because it provides better accuracy, however, the more bits used for EDAC, the slower the data transmission rate becomes. In a preferred embodiment, the location identifier is only a few bytes, therefore the number of additional bits for EDAC can be significantly more, resulting in a high degree of accuracy.

As an example, an identifier code 'xxx01010100xxx' (54 hex), along with some error correction bits (denoted by 'x'), is transmitted to a receiver comprising position input 16 included with the digital equipment 1. The data is processed by the EDAC circuitry 15 for extracting the identifier code "01010100." The configuration process determines the geographic location of the digital equipment by correlating the identifier code with the information stored in the location database 7.

When using a simulcast system, there may be geographic locations which overlap and receive multiple location identifiers resulting in ambiguities in the position input 16. These ambiguities are resolved by the process of steps 34–39 using heuristic methods and user input when necessary.

Figure 5:
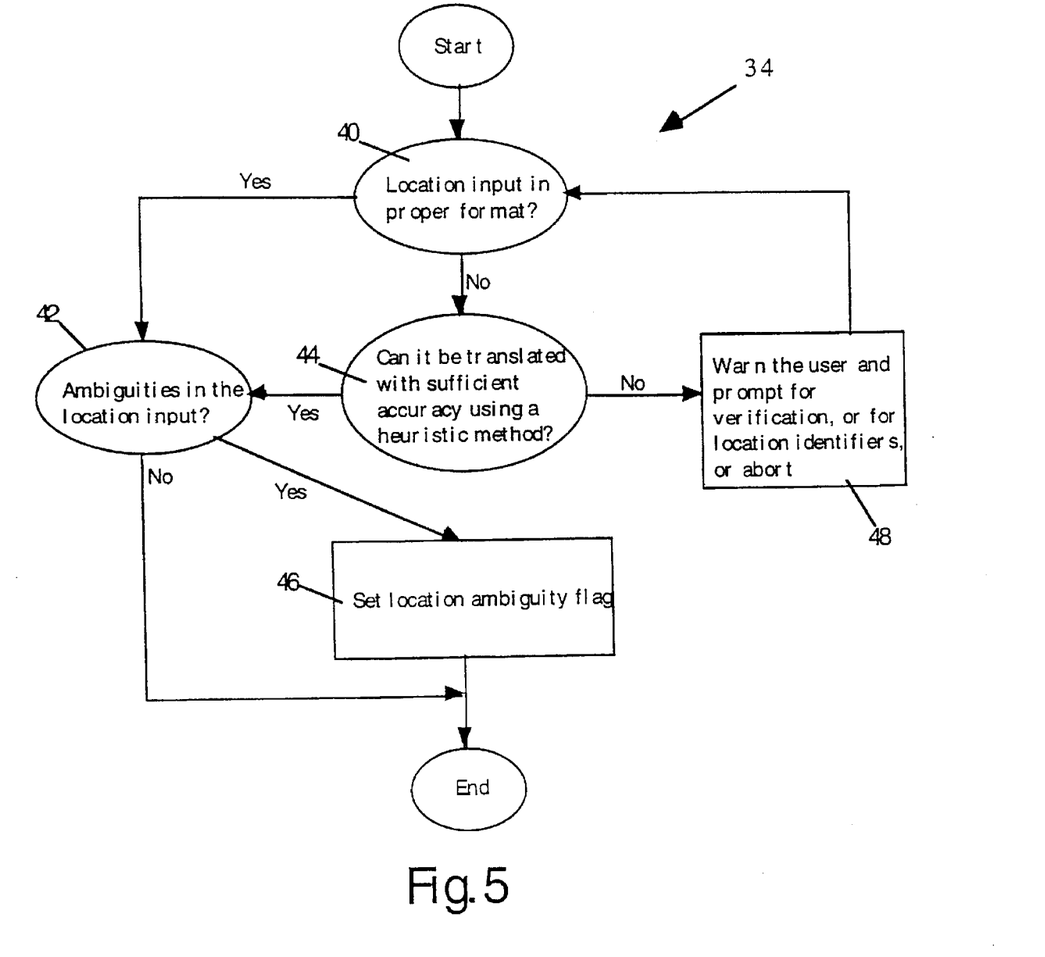
FIG. 5 is a flow chart of the steps for detecting and correcting format errors in the location input, and for detecting location ambiguities in accordance with a preferred embodiment.

FIG. 5 details the process 34 of FIG. 4 for ascertaining the location. First, the format of the location input is verified in a step 40, and if there are no format problems in the input, it is checked for location ambiguities in a step 42. Otherwise, if the format is not proper, a heuristic method is used in step 44 to determine if the input can be translated to the proper format. Heuristic methods such as that performed by step 44 are well known to those skilled in the art, and can include assuming the format is the most commonly used format, assuming the format is the last used format, matching the improper format against a database of formats for the best fit, etc.

For GPS systems, the GPS receiver may malfunction resulting in ambiguous latitude and longitude coordinates. For instance, the receiver may function correctly most of the time, but have sporadic failures. Similarly, ambiguities in a simulcast system occur when the digital equipment receives multiple location identifiers due to overlapping transmission areas. The process 34 attempts to resolve these ambiguities automatically in step 44 by using, for example, the average reading and/or by using past location information to anticipate the geographic location through extrapolation.

In resolving the ambiguities automatically using the heuristic method of step 44, the process 34 preferably chooses the location with the highest probability of being correct. The confidence level of the best guess is compared with a predetermined threshold level to verify sufficient accuracy of step 44 before attempting to configure the communication channel. The threshold level varies depending on the application. When configuring a modem to facilitate the network standard of a foreign country, the threshold level is very high because a false positive results in undesirable interference with the telephone lines. On the other hand, the threshold level is moderate for configuring a modem to connect to an electronic information service because a false positive only means the portable computer will not connect. These thresholds can be stored as part of location database 7 or configuration database 9. If the ambiguity cannot be resolved automatically or the confidence is below the threshold, the user is warned and prompted to verify the best guess or to enter location identifiers to aid the heuristic method 48.

If the user decides to enter additional location information manually in step 48, the step 48 attempts to verify the input. For instance, if the user is entering a zip code or area code, step 48 only accepts numbers as input. When entering a name such as a state or city name, if the user misspells a word, the step 48 warns the user and displays a list of closely matching correctly spelled locations for the user to select. If the user enters inconsistent location information, such as entering a zip code that does not exist for the entered city, the step 48 warns the user and displays a list of other correct choices. The step 48 will continue to warn the user and provide correct choices until the information is in the proper format.

If the location input cannot be translated into the proper format either automatically 44 or with help from the user in step 48, the process is aborted by step 48.. Otherwise, the location input is checked for location ambiguities and a flag is set if ambiguities are detected 46. Ambiguities can occur if the detected location input maps into several possible locations according to the location database 7.

Figure 6:
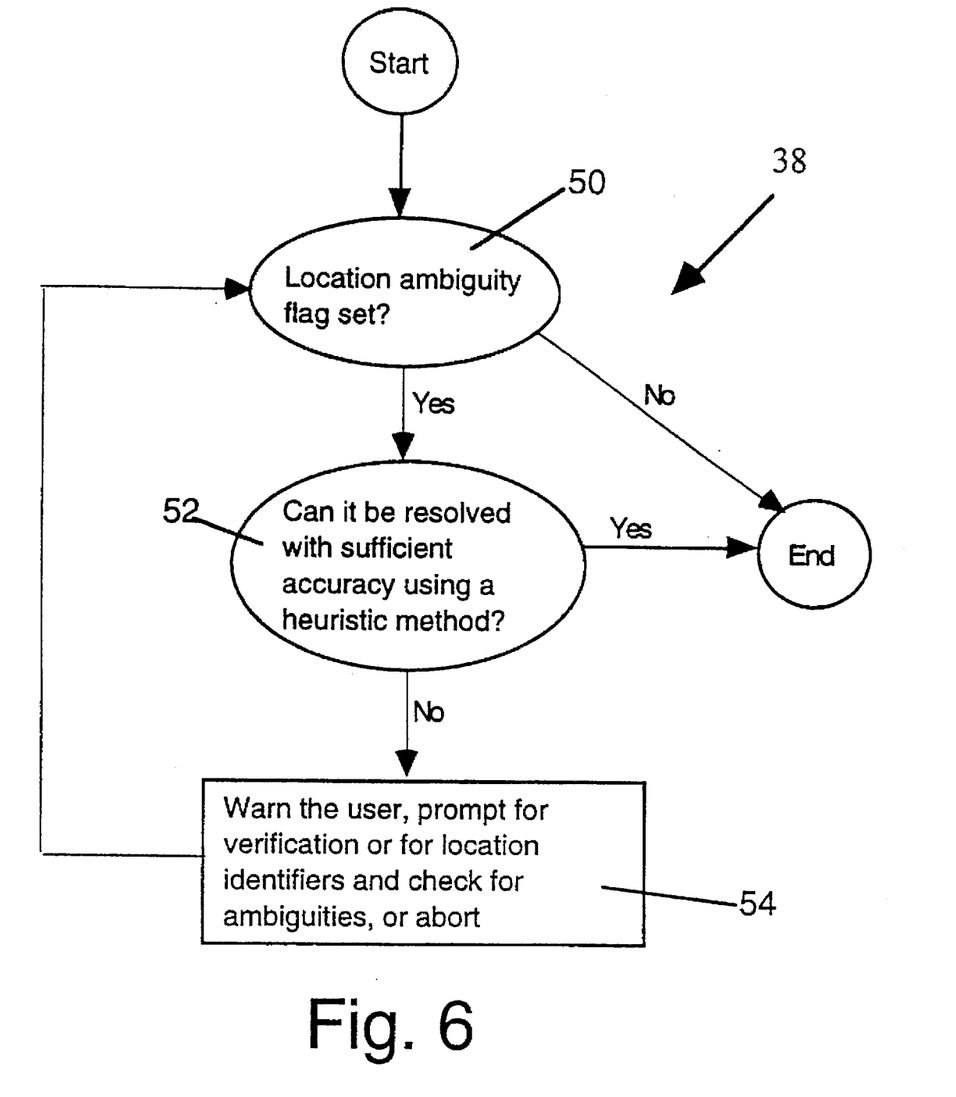
FIG. 6 is a flow chart of the steps for resolving location ambiguities in accordance with a preferred embodiment.

In FIG. 6, the process 38 for resolving location ambiguities includes checking the location ambiguity flag in a step 50, and if set, the process 38 uses a heuristic method to determine if it can be resolved automatically in a step 52. Again, heuristic methods are well known to those skilled in the art. Ambiguities result in several possibly correct choices for configuring the communication process. Again, the process 38 will not automatically configure the communication channel unless the probability of at least one choice being correct is above a threshold as determined by step 52, and if not, the user is prompted to verify the best guess or enter location identifiers to aid the heuristic method in a step 54. If the ambiguity is not resolved, the process may be aborted by step 54.

If a location is determined to be sufficiently accurate by step 52, process control returns to step 20 of FIG. 2. The configuration process 5 initializes an output on a communications channel based upon the deduced location in step 20, provides a communication on the communications channel in step 22, and verifies that the digital equipment is successfully communicating in step 23.

For example, if the user is attempting to connect to an electronic information service, the location information may map into several possible local and long distance access numbers according to the configuration database 9. The process 5 will preferably choose one of the local numbers first in step 20 to configure the communication process. If the process 5 fails to connect because the first local access number is busy or incorrect, the step 23 will return process control to step 20 to try the other local access numbers. If all the local access numbers fail, the user can be warned and prompted to either select one of the long distance access numbers, or to change the location information.

Figure 7:
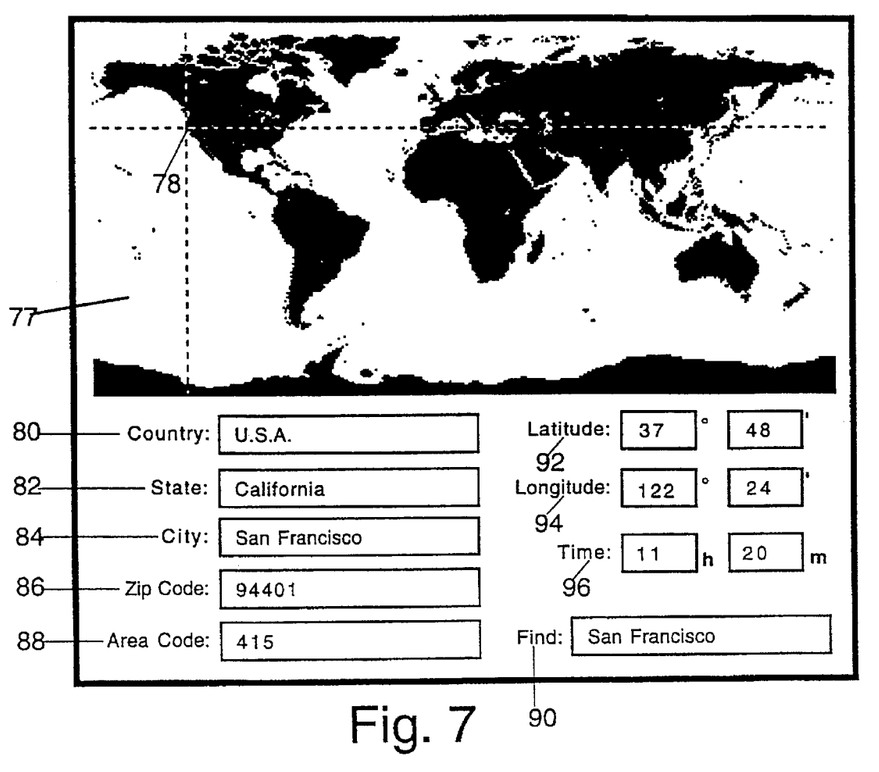
FIG. 7 depicts a world map displayed in a graphical user interface for selecting the geographic location with a pointer device, or by entering location identifiers such as country, state, city, zip code or area code in accordance with a preferred embodiment.

FIG. 7 illustrates a graphical user interface (GUI) for an alternate embodiment for the process 32 of FIG. 4. In this alternate embodiment, position input is provided by a user entering position inputs such as the country 80, state 82, city 84, zip code 86, and/or area code 88. This form of GUI can also be used to resolve ambiguities in step 39 of FIG. 4. The user input can be accomplished by, but is not limited to, keyboard, mouse, voice, or electronic pen (stylus) input. All of these input mechanisms are well known to those skilled in the art. For digital equipment with a graphical user interface, a country or global map 77 is preferably displayed for the user to select the location using a pointing device such as a mouse or a pen. A cross-hair 78 comprising intersecting vertical and horizontal broken lines is preferably displayed to indicate the user's selection.

The user input may not always be consistent or in the correct format. For instance, the user might select San Francisco on the global map 77, but might enter a zip code that does not exist or that is in the wrong format. Similarly, the user might enter location information, such as only the country name, resulting in ambiguous corresponding geographic locations. Resolving format and ambiguity errors in the user input is handled by processes 34–39 of FIG. 4.

Figure 8:
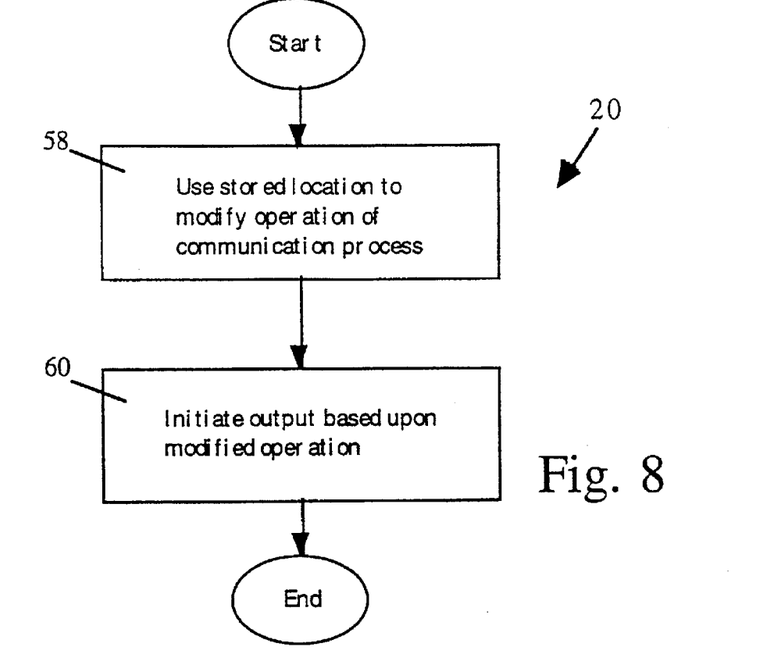
FIG. 8 is a flow chart of the steps for configuring a digital equipment's communication process based on the digital equipment's location in accordance with a preferred embodiment.

FIG. 8 is a flow chart illustrating step 20 of FIG. 2 for initiating the digital equipment's communication processes based on its location. There are two preferred embodiments for using the digital equipment's location to modify the communication process 58 of a preferred embodiment. Both methods use the location to retrieve the configuration information from the configuration database 9, but in the first method the configuration process is part of the communication application, where as in the second it is a stand alone device driver. Both methods also automatically reconfigure the communication process based on the digital equipment's geographic location without user intervention, unless user input is required to resolve format errors in the input, resolve ambiguities in the location, desires to manually input a location, etc.

Because a device driver modifies the function of the operating system, it is desirable to link the configuration process 5 into the communications channel. If the operating system changes when a new version is released, the configuration process 5 will still be compatible with the new version of the system. Further, it is not necessary to write a device driver for every operating system if the configuration process 5 is linked into the communications application.

Figure 9:
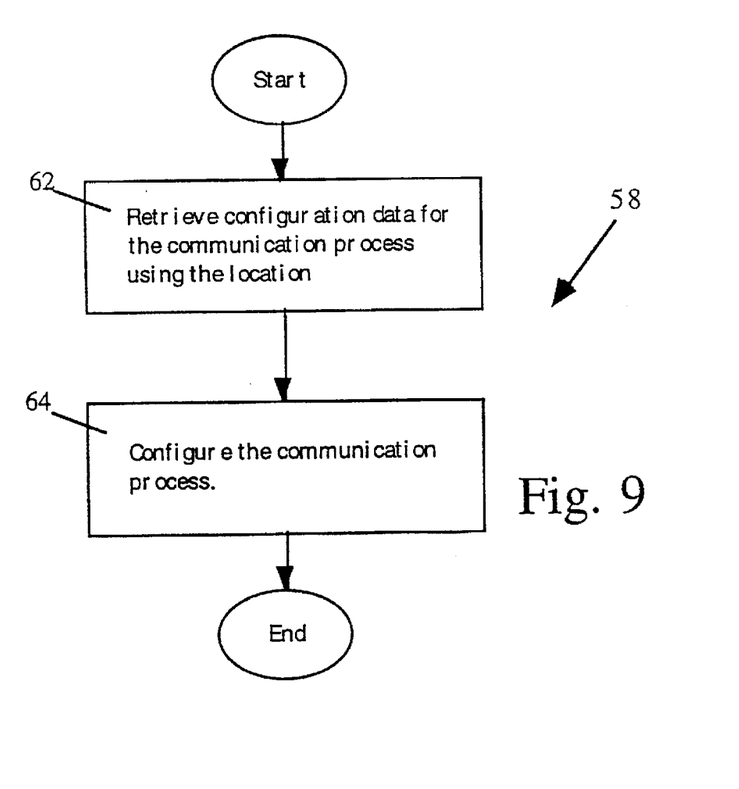
FIG. 9 is a flow chart of the steps for replacing the configuration parameters of the communication process based on the digital equipment's location in accordance with a preferred embodiment.

FIG. 9 illustrates a first preferred embodiment 58' for accomplishing step 58 of FIG. 8. Since the configuration process 5 is part of the communications application, the configuration process 5 can retrieve the configuration information 62 from the configuration database 9 and configure (i.e. modify) the communications application 64 directly. However, it may be difficult to link the configuration process 5 into all existing communications applications. Therefore, it is desirable to provide a method for configuring the communication process that is independent from the communications application by implementing the configuration process 5 as a device driver. Typically, a device driver is a process for configuring a device such as a printer, scanner, disk drive, and in a preferred embodiment, a communication process. Device drivers are usually loaded when the computer is booted and run concurrently with other applications such as communications applications. The process of writing device drivers is well known and described in various publications for the different operating systems.

Figure 10:
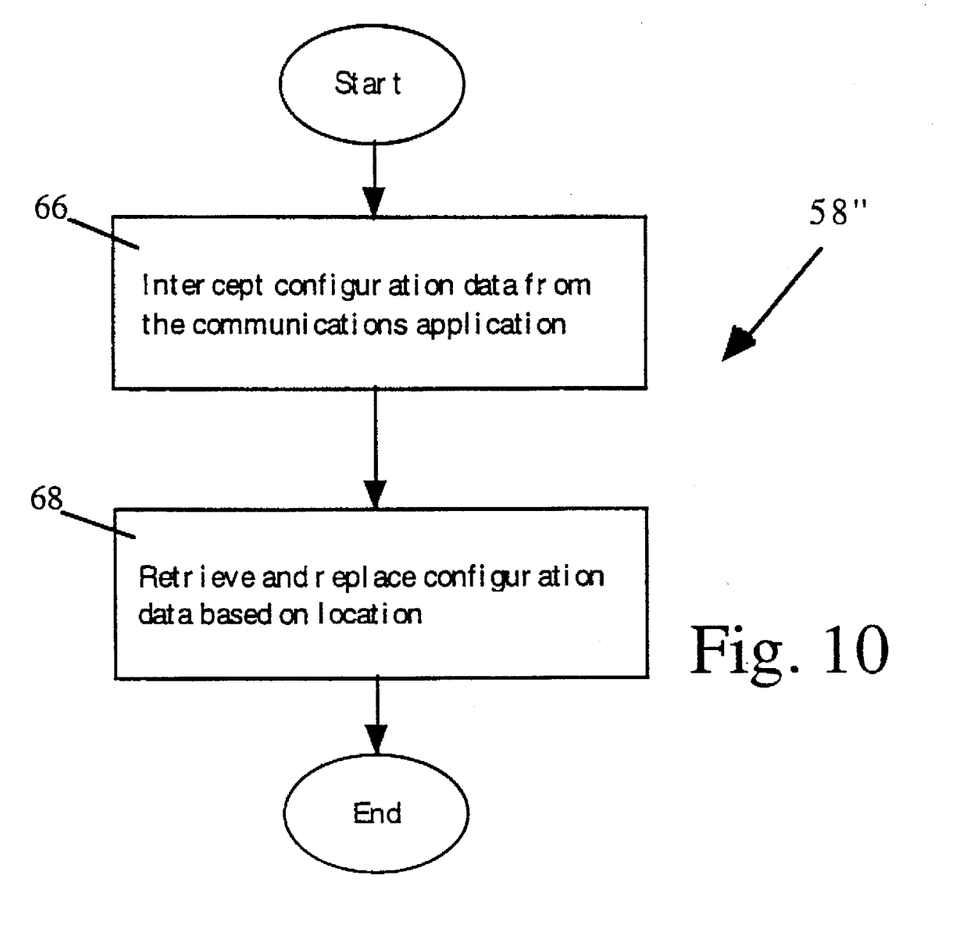
FIG. 10 is a flow chart of the steps for intercepting data from the communication process and converting the data based on the digital equipment's location in accordance with a preferred embodiment.

FIG. 10 illustrates a second preferred embodiment 58" for accomplishing step 58 of FIG. 8. Most communications applications configure the communication process by interfacing to the communication device driver through system interrupts or traps. The interrupt service routines for the operating system device driver can be replaced by the device driver of the configuration process 5. The configuration process can then intercept the configuration data as it is being sent from the communications application in a step 66, and replace it in a step 68 with the configuration information in the configuration database 9. The configuration data is then passed to the operating system device driver.

For example, assume that a portable computer is typically located in a first location having a telephone area code 408, but is transported to a second location having a telephone area code 415. Let us also assume that the first location is within a company requiring a "9" to be dialed prior to obtaining an outside line, and that the second location is at a private residence where an outside line is immediately available.

If the user of the portable computer often dials into a database from location one by dialing "9-555-1234" from their company telephone and then wishes to dial into this same database from the second location, the following processes occur. With the process 58' of FIG. 9, the data structure of the communications program can be modified such that the telephone number 9-555-1234 is replaced with 1-408-555-1234. This will result in the communications program dialing the database in the 408 area code from the 415 area code. Alternatively, if the database has a node in the 415 area code, such as 415-555-4321, process 58 can replace the telephone number 9-555-1234 with 555-4321. Of course, by "replace" it is meant that the telephone number is temporarily replaced for use while the portable computer is in the second location.

With the process 58" of FIG. 10, the process takes a different tack. In this instance, data from a communications program is "intercepted" by step 66. This can be easily accomplished by running a memory-resident program which looks for certain sequences or conditions being sent to a communications port. For example, modem ports are often initialized by the sequence "ATDT" after which the telephone number is provided to the modem port. The step 66 can provide a state machine looking for the sequence "ATDT" at the modem port and intercept the telephone number 9-555-1234 before it reaches the modem port. The step 66 then replaces the intercepted number with another number, such as 1-408-555-1234 (to dial the database node near location one) or 555-4321 (to dial the database node near the location two where the computer current is located).

Referring again to FIG. 2, after the communication channel has been configured, the configuration process 5 verifies that the operation was successful by checking whether the digital equipment is communicating 23. The configuration can fail if the process for resolving format ambiguities 34 or location ambiguities 36 resulted in a false positive. If the configuration fails, the configuration process 5 retries the other valid choices until they are exhausted. Once all the choices that were determined automatically have been tried, the configuration process 5 prompts for user input. The user can enter location identifiers to resolve the error, or abort the process.

If the configuration process 5 is linked into the communications application, the process of checking for valid communications and retrying other choices is straightforward since the process is part of the application. However, if the configuration process 5 is implemented as a device driver, the interrupts which receive data from the communication channel and generate time-out errors must be overridden. Overriding operating system interrupts is undesirable, but unavoidable where the configuration process 5 cannot be linked into existing communications applications.

Typically, a modem is used for providing a communication on a communication channel 22. A modem is a device for transforming serial data into a form suitable for transmission through the telephone system, and vice versa. The modem can be connected directly to the digital equipment, or through a network. If the modem is connected through a network, the digital equipment must also be able to connect to the network. Most modems are connected directly to the telephone wire, but some modems are capable of transmitting wireless using cellular technology.

Before transmitting data using the communication process, it is preferably serialized for transmitting asynchronously or synchronously. The communication process is configured to transfer data at the baud rate compatible for the modem and the selected telephone number. If the communication is asynchronous, the number of data bits, start bits, stop bits, and parity must also be configured. When using synchronous communication such as SDLC, these additional bits are not specified.

Of course, other communication channels beside modems can be used. The communication channel 14 can comprised such channels as infrared (IR) channels, hardwire channels, network nodes, microwave channels, ultrasonic channels, or any other channel coupled, directly or indirectly, to the position input 16 by electrical, electromagnetic, magnetic, sonic, or other communications media.

It should be noted that the communications channel 14 can also, in some circumstances, serve as the position input 16. For example, if a portable computer is coupled to a node of a local area network that is provided with a NetModem (a modem coupled to the network as a general resource), the communications channel can provide that information to the digital equipment 1. Modem communications that would otherwise be directed to the modem port of the personal computer can, instead, be directed to the NetModem by the process and apparatus of a preferred embodiment. Likewise, communication speeds can be modified, parity bits set, etc.

The location database 7 and configuration database 9 are preferably periodically updated. For instance, when a new electronic information service becomes available, the databases are preferably updated with the locations where the service is accessible, and the configuration information such as the telephone numbers and corresponding baud rates for the different locations. The databases are updated with new location and configuration information by the user entering the information into the digital equipment using a keyboard, or by transferring the information to the digital equipment using removable storage devices such as floppy disk drives, or by transferring the information to the digital equipment over a network.

Figure 11:
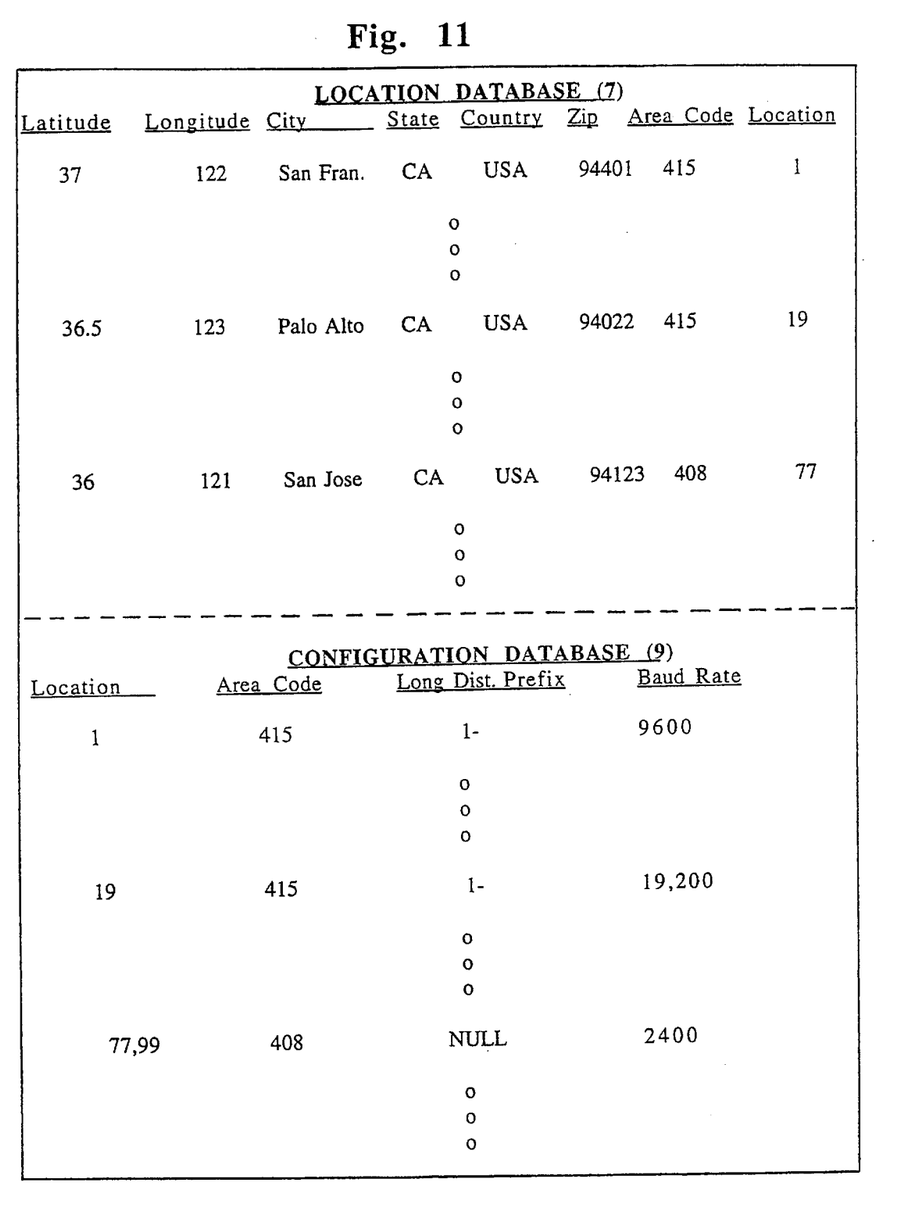
FIG. 11 illustrates the process of FIG. 10 by way of an example in accordance with a preferred embodiment.

In FIG. 11, examples of the location database 7 and configuration database 9 are illustrated. Again, the form and structure of databases 7 and 9 are not critical, and any number of formats could be used. For example, the databases could be stored as flat files, relational files, objects, flames, or in any other convenient format. The databases 7 and 9 can separate as shown, integrated together, broken into small, linked sections, or formed as part of a "soup." The important factor about databases 7 and 9 is that data can be retrieved to allow the implementation of the aforementioned processes of a preferred embodiment.

With the knowledge that the following discussion is by way of example only, assume the facts of the previous scenario of a user moving from a first location in telephone area code 408 to a second location in telephone area code 415. When the position information is received, it typically can map into several locations of location database 7. Heuristics are used to resolve ambiguities and determine the most likely location. If, for example, latitude and longitude data on position input 16 is not precise, any of locations 1, 19, or 77 might be selected as possibilities. If a user input that they were in area code 415, the location 77 can be eliminated. If the user input that they were in Palo Alto, all ambiguities (at least at this level of resolution) are removed, and the process 5 knows that the computer is located in location 19.

The location provided by the location database 7 can then be used in conjunction with the configuration database 9 to determine the correct communication processes, protocols, and commands. For example, for location 19 the area code is known to be 415, the long distance prefix is known to be "1-", and the baud rate is known to be 19,200. Of course, there may be multiple locations known within the city of Palo Alto (even within a single building), so the resolution of the databases can be increased to accommodate communication differences at such location.

It should be noted that more than one location may share the same configuration database 9 data. For example, south Sunnyvale (location 99) may share the same configuration database data as San Jose (location 77). Again, the resolution of the database can be modified to the level of detail and accuracy desired by the user.

While the invention is described in terms of preferred embodiments in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A method for configuring the communications of digital equipment, comprising the steps of:
   (a) storing configuration information to configure at least one communication process implemented by a digital equipment;
   (b) communicating location information to the digital equipment through a position input, said position input comprising a receiver responsive to at least one of a Global Positioning System signal and a LORAN system signal;
   (c) determining the location of the digital equipment; and
   (d) reconfiguring said at least one communication process implemented by said digital equipment utilizing the configuration information and the determined location, said reconfiguring including at least reconfiguring a telephone number, such that a subsequent digital communication can be properly made by said digital equipment by dialing said reconfigured telephone number.

2. The method as recited in claim 1, further including the step of determining the location using a wireless network.

3. The method as recited in claim 2, further including the steps of:
   (a) transmitting a plurality of identifiers corresponding to a plurality of geographic locations; and
   (b) connecting a receiver to the position input for receiving the identifiers.

4. The method as recited in claim 3, further including the steps of:
   (a) connecting error detection and correction circuits to the position input; and
   (b) transmitting additional error detection and correction bits along with the identifiers; and
   (c) detecting and correcting errors in the identifiers utilizing the error detection and correction circuits.

5. The method as recited in claim 1, further including the steps of:
   (a) entering location identifiers provided by a user; and
   (b) determining the location using the location identifiers.

6. The method as recited in claim 1, further including the steps of:
   (a) detecting format errors in the location information; and
   (b) translating the location information into a proper format; and
   (c) detecting ambiguity errors in the location; and
   (d) resolving the ambiguity errors in the location.

7. The method as recited in claim 6, further including the steps of:
   (a) translating the location information into a proper format using a first heuristic method comprising the steps of:
      collecting a plurality of location information readings and computing an average value of the location information readings; and
      anticipating a current location by extrapolating past location information; and
   (b) resolving the ambiguity errors in the location using a second heuristic method comprising the steps of:

storing a threshold value;
collecting a set of locations with a confidence level of accuracy above the threshold value; and
repeatedly configuring the communications process using a location from the set of locations with descending confidence levels of accuracy until configuring the communications process is successful.

8. The method as recited in claim 7, further including the steps of:
   (a) entering location identifiers provided by a user to override or aid the first heuristic method; and
   (b) entering location identifiers provided by a user to override or aid the second heuristic method.

9. The method as recited in claim 5 or 8, further including the step of entering the location identifiers provided by the user using a keyboard or a pointing device.

10. The method as recited in claim 9, further including the step of displaying a map in a graphical user interface for the user to select the location using the pointing device.

11. The method as recited in claim 1, further including the steps of configuring the at least one communication process with a baud rate corresponding to each telephone number.

12. The method as recited in claim 11, further including the steps of configuring the at least one communication process with a number of data bits, a number of start bits, a number of stop bits and a parity check corresponding to each telephone number.

13. The method as recited in claim 1, further including the steps of:
   (a) linking a configuration process into a communications application; and
   (b) reconfiguring the digital equipment utilizing the configuration process.

14. The method as recited in claim 1, further including the steps of:
   (a) operating the digital equipment with an operating system;
   (b) determining the operating system interrupts used to configure the communication process of the digital equipment;
   (c) replacing the operating system interrupts with a configuration process; and
   (d) reconfiguring the digital equipment utilizing the configuration process.

15. An apparatus for configuring digital equipment comprising:
   (a) a storage for storing configuration information including at least telephone dialing information for configuring at least one communication process, including configuring a telephone number, of the digital equipment;
   (b) a wireless position input including a receiver for receiving location information from at least one of a Global Positioning System and a LORAN system;
   (c) a processor attached to and controlling the position input for receiving the location information, and attached to an controlling the storage for storing configuration information; and
   (d) a configuration process running in the processor for determining the location of the digital equipment, and for reconfiguring the at least one communication process, including said telephone number, of the digital equipment utilizing the determined location and configuration information.

16. The digital equipment as recited in claim 15, further including error correction and detection circuits disposed between the position input and the processor for detecting and correcting errors in the location identifiers.

17. The digital equipment as recited in claim 15, wherein determining the location of the digital equipment uses location identifiers entered by a user.

18. The digital equipment as recited in claim 15, wherein the configuration process comprises:
   (a) a mechanism translating the location information into a proper format; and
   (b) a mechanism determining the geographic location of the digital equipment; and
   (c) a mechanism resolving ambiguities in the location of the digital equipment.

19. The digital equipment as recited in claim 18, wherein the mechanism translating the location information into a proper format uses a first heuristic method comprising the steps of:.
   collecting a plurality of location information readings and computing an average value of the location information readings;
   anticipating a current location by extrapolating past location information;
   and the mechanism resolving ambiguities in the geographic location uses a second heuristic method comprising the steps of:
   storing a threshold value;
   collecting a set of locations with a confidence level of accuracy above the threshold value; and
   repeatedly configuring the communications process using a geographic location from the set of locations with descending confidence levels of accuracy until configuring the communications process is successful.

20. The digital equipment as recited in claim 19, further comprising:
   (a) a mechanism entering location identifiers provided by a user for overriding or aiding in the translating location information into a proper format by the first heuristic method; and
   (b) a mechanism entering location identifiers provided by a user for overriding or aiding in the resolving ambiguities in the geographic location by the second heuristic method.

21. The digital equipment as recited in claim 17 or 20, wherein the location identifiers are entered by the user using a keyboard or a pointing device.

22. The digital equipment as recited in claim 21, further including a map displayed in a graphical user interface for the user to select the location using the pointing device.

23. The digital equipment as recited in claim 15, wherein reconfiguring the at least one communication process of the digital equipment uses a baud rate corresponding to each telephone number.

24. The digital equipment as recited in claim 23, wherein reconfiguring the at least one communication process of the digital equipment uses a number of data bits, a number of start bits, a number of stop bits and a parity check corresponding to each telephone number.

25. The digital equipment as recited in claim 15, wherein the configuration process is linked into a communications application.

26. The digital equipment as recited in claim 15, further including:
   (a) an operating system for running the processor; and
   (b) at least one operating system interrupt service routine for configuring the at least one communication process; and (c) the configuration process being a device driver with at least one configuration process interrupt service routine for replacing the at least one operating system interrupt service routine for configuring the at least one communication process.

27. A method for configuring the communications of a portable computer system, comprising the steps of:

(a) storing configuration information to configure at least one communication process of a portable computer system, said portable computer system including a central processing unit (CPU), an input/output (I/O) circuit, and a communications port coupled to said CPU by said I/O circuit, said communication process communicating with external digital equipment through said communications port of said portable computer system;

(b) communicating current location information to the portable computer system through a wireless position input means including at least one of a Global Positioning System and a LORAN system;

(c) determining the current location of the portable computer system from said current location information; and (d) reconfiguring the portable computer system utilizing the configuration information and the determined current location including re-configuring a telephone number of a remote digital system with which said portable computer system will communicate, such that a subsequent digital communication with said remote digital system via said port can be properly made by said portable computer system.

28. The method as recited in claim 27 wherein said current location information is provided, at least in part, by a Global Positioning System (GPS).

29. The method as recited in claim 27 wherein said current location information is provided, at least in part, by a LORAN system.

30. The method as recited in claim 27 wherein said current location information is provided, at least in part, by a wireless network.

31. The method as recited in claim 27 wherein said current location information is provided, at least in part, by a user input that is subsequently displayed on a screen of said portable computer system.

32. The method as recited in claim 27 wherein said reconfiguring step modifies a telephone number.

33. The method as recited in claim 27 wherein said reconfiguring step modifies a baud rate of said communication process.

34. A portable computer system comprising:

a central processing unit (CPU);

digital memory coupled to said CPU;

input/output (I/O) circuitry coupled to said CPU;

a communications port coupled to said I/O circuitry to communicate with said CPU;

locator means coupled to said I/O circuitry to communicate with said CPU and to provide said CPU with current location information, said locator including a wireless receiver receptive to at least one of a Global Positioning System and a LORAN system; and processing means stored in said digital memory and executing on said CPU for processing said current location information and for controlling a communications process utilizing said communications port, wherein at least one communication protocol including a telephone number of said communications process is dependent upon said current location information.

35. A portable computer system as recited in claim 34 wherein said locator means comprises a user input device.

36. A portable computer system as recited in claim 34 wherein said communications protocol comprises a communication rate.

37. A portable computer system as recited in claim 34 wherein said communication protocol comprises an error checking protocol.

* * * * *